US012756777B2

(12) United States Patent
Seay

(10) Patent No.: US 12,756,777 B2
(45) Date of Patent: Oct. 6, 2026

(54) METHODS AND SYSTEMS FOR AUGMENTING CALLER ID INFORMATION

(71) Applicant: Gordon E. Seay, San Diego, CA (US)

(72) Inventor: Gordon E. Seay, San Diego, CA (US)

( * ) Notice: Subject to any disclaimer, the term of this patent is extended or adjusted under 35 U.S.C. 154(b) by 258 days.

(21) Appl. No.: 17/817,337

(22) Filed: Aug. 3, 2022

(65) Prior Publication Data

US 2024/0048654 A1 Feb. 8, 2024

(51) Int. Cl.
*H04M 3/42* (2006.01)

(52) U.S. Cl.
CPC ................................ *H04M 3/42068* (2013.01)

(58) Field of Classification Search
CPC ................................................. H04M 3/42068
USPC ..................................................... 379/142.06
See application file for complete search history.

(56) References Cited

U.S. PATENT DOCUMENTS 6,721,406 B1 * 4/2004 Contractor ............ H04M 15/00 379/201.08
6,940,954 B1 * 9/2005 Toebes .................. H04M 7/006 709/219
7,031,441 B1 * 4/2006 Edwards ............. H04L 12/2874 379/265.09
8,218,736 B1 * 7/2012 McClintock ...... H04M 1/72433 455/412.2
8,879,702 B1 * 11/2014 White ..................... H04W 4/16 379/142.04
2004/0141602 A1 * 7/2004 Gosselin ................. H04W 4/20 379/142.1
2004/0264660 A1 * 12/2004 McCullough ....... H04M 3/5183 379/114.01
2011/0319061 A1 * 12/2011 Schmackpfeffer .... H04L 51/224 455/415

* cited by examiner

*Primary Examiner* — Binh Kien Tieu

(57) ABSTRACT

Disclosed are methods and systems for obtaining and transmitting augmented telephonic entity data to a device or data storage. An example method includes providing a telephonic switching and computing framework, providing access to a data storage, receiving a telephone call from a switched telephone network (STN), receiving caller ID information from the STN, then in response to a trigger, searching for and retrieving within the data storage an augmented data record, and further in response to the trigger event, transmitting the augmented data element to a device. An example system generally comprises a data storage, a telephonic apparatus configured to receive a call with caller ID information from a switched telephone network (STN), a network-connected computing apparatus configured to, in response to a trigger, search for and retrieve an augmented data element associated with the caller ID information, and transmit the augmented data element to a device over a network.

20 Claims, 7 Drawing Sheets

METHODS AND SYSTEMS FOR AUGMENTING CALLER ID INFORMATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present disclosure relates generally to methods and systems for obtaining augmented telephonic entity data and communicating augmented telephonic entity data to a device and/or saving augmented telephonic entity data to a data storage.

Caller ID information presented from switched telephone networks (STNs) typically includes either solely the caller telephone number or sometimes the caller telephone number along with CNAM (caller name) information.

CNAM information, even when present, is often inaccurate or, due to protocol limitations, abbreviates an entity's name such that the recipient of a call may only see the first letter of someone's name or the first letter of their last name or a truncated name.

CNAM data can also be misleading. Even if a caller name is presented with the call, the registered name in the CNAM database sourced by the callee's telephone company may be different than the familiar name by which the callee knows the person or business entity which is calling them. For example, a caller may have their maiden name in a CNAM database with their telephone company yet a callee knows the caller by their married name. Thus, even when a callee sees a caller name presented with an incoming call, the name may not be recognizable despite having familiarity with the entity.

Originating telephone companies, which may possess more information on the callee who originates a call, are unable to pass along such additional information, due to limitations in the established communication protocols of the STNs.

Even if protocols allowed for the passing of additional data, originating telephone companies also do not possess all possible data on a caller, such as their email address, photo, or other relevant information.

Sourcing additional data can also be expensive for originating carriers to procure and there is little incentive for them to do so. As a result, when they and related carriers pass a call to a termination point, the data made available on a calling entity, the callee, is frequently limited, truncated or missing.

There exists a current foundational problem in that a receiving party to a call, a callee, often has limited information on the person calling, the caller (i.e. the calling entity). They may not know the caller's name or their full name. If they know a personal name from presented CNAM information, they may not know the company from which they are calling, or vice-versa. If they receive a call from someone impersonating a bank or an online retail store, they don't have enough information on the calling entity, the caller, to verify them further, such as knowing their email address (which may not be associated with a bank), their city, or other information which could help mitigate the caller's attempts to defraud the callee.

There further exists a foundational problem beyond mitigation of fraud in that anyone who receives a call from an unknown or little-known caller phone number over a STN may be hesitant to answer the call or return the caller's call if a message was left. They would benefit from knowing more about the caller but little information is available. Before number portability, one could surmise from remembered area codes at least the location of a caller but nowadays portability still makes a caller's true source location unclear because perhaps they relocated and moved their New York area code and phone number with them to Los Angeles.

Sales and support staff at companies are also unable to handle incoming calls to the best of their abilities when they have deficient information on a caller. If they knew a caller's geographic region, and local news applicable to that region, they might build rapport and better perform their job functions. Additionally, by having additional information on a caller, sales and support staff at companies can mitigate inbound efforts to defraud them by callers attempting to impersonate someone else. In a medical environment, for example, someone wrongly attempting to obtain HIPAA-restricted information not intended for them, by impersonating the patient, could be verified through additional information automatically made available about the caller.

Knowledge of differential, additional data could also affect whether a callee wishes to accept or reject a call, and if a call is accepted other data about a caller could affect the handling of a call after acceptance thereof (i.e. answering the call) and greatly improve the customer experience.

Meanwhile, there exist other sources of data which describe entities, such as databases which may contain entity information including a telephone number, an email address, a full legal name, etc.

There exist further sources of data which can align non-telephonic data, such as a plain address or a plain email address, with additional information on an entity. These sources of data can be associated with other sources of data to extend a chain of what data exists on any single entity, by joining records of data between data elements not even present in the original caller ID information passed from the STN. But, currently, this type of additional data is not readily available to recipients of telephone calls. If it could be researched, such could be impractical in a reasonable period of time.

Thus, there exists a need for methods or systems which, augment caller ID information and transmit such information to a device or save such information to a data repository which could be made available for the benefit of callees and those with whom they are associated. There exists a need for methods and systems which allow a callee to accept or reject a call, or return a call following receipt of voicemail, based upon additional data, often presented quickly without additional steps. There exists a need for methods and system which allow a callee to improve a call experience based upon additional data provided to them about the caller, their geographic whereabouts or information concerning their social media profile. There exists a need for methods and systems which allow a callee's organization to deter impersonation of actual other people who have an account with said organization. There exists a need for methods and systems which allow an individual callee not associated with an organization to better identify a caller, which is markedly different than what occurs when receiving standard caller ID information. There exists a need for methods and systems which help sales organizations know more about their prospects and customers based upon having additional information about the calling entity. Even in the gaming industry, or many other industries, callees knowing more about callees can be of added value. Examples of new and useful methods and systems relevant to the needs existing in the field are discussed below.

BRIEF SUMMARY

The present disclosure is directed to methods and systems for obtaining and communicating augmented telephonic entity data to a device and/or saving augmented telephonic entity data to a data storage. One example of a presented method generally includes providing a telephonic switching and computing framework, providing access to a data storage, receiving an incoming telephone call from a switched telephone network (STN), receiving caller ID information from the STN, then in response to a trigger event, searching for and retrieving within the data storage an augmented data record, and further in response to the trigger event, transmitting the augmented data element to a device over the network.

Another example of a presented method further associates additional augmented data which may be derived from a second data storage.

Another example of a presented method is directed to saving augmented data to a data storage.

One example of a presented system generally comprises a data storage, a telephonic apparatus configured to receive a call with caller ID information from a switched telephone network (STN), a network-connected computing apparatus configured to, in response to a trigger event, search for and retrieve an augmented data element associated with the caller ID information, and transmit the augmented data element to a device over a network.

The invention permits augmented data to be associated with original caller ID information to thus meaningfully provide additional information about a caller entity. The invention solves real-world problems including, but not limited to, mitigating fraud, enhancing verification, improving sales and customer service experiences, and enhancing insight into a caller's identity, lifestyle, geography, distance to the callee, local news, among many other potential pieces of data.

DETAILED DESCRIPTION

Figure 1:
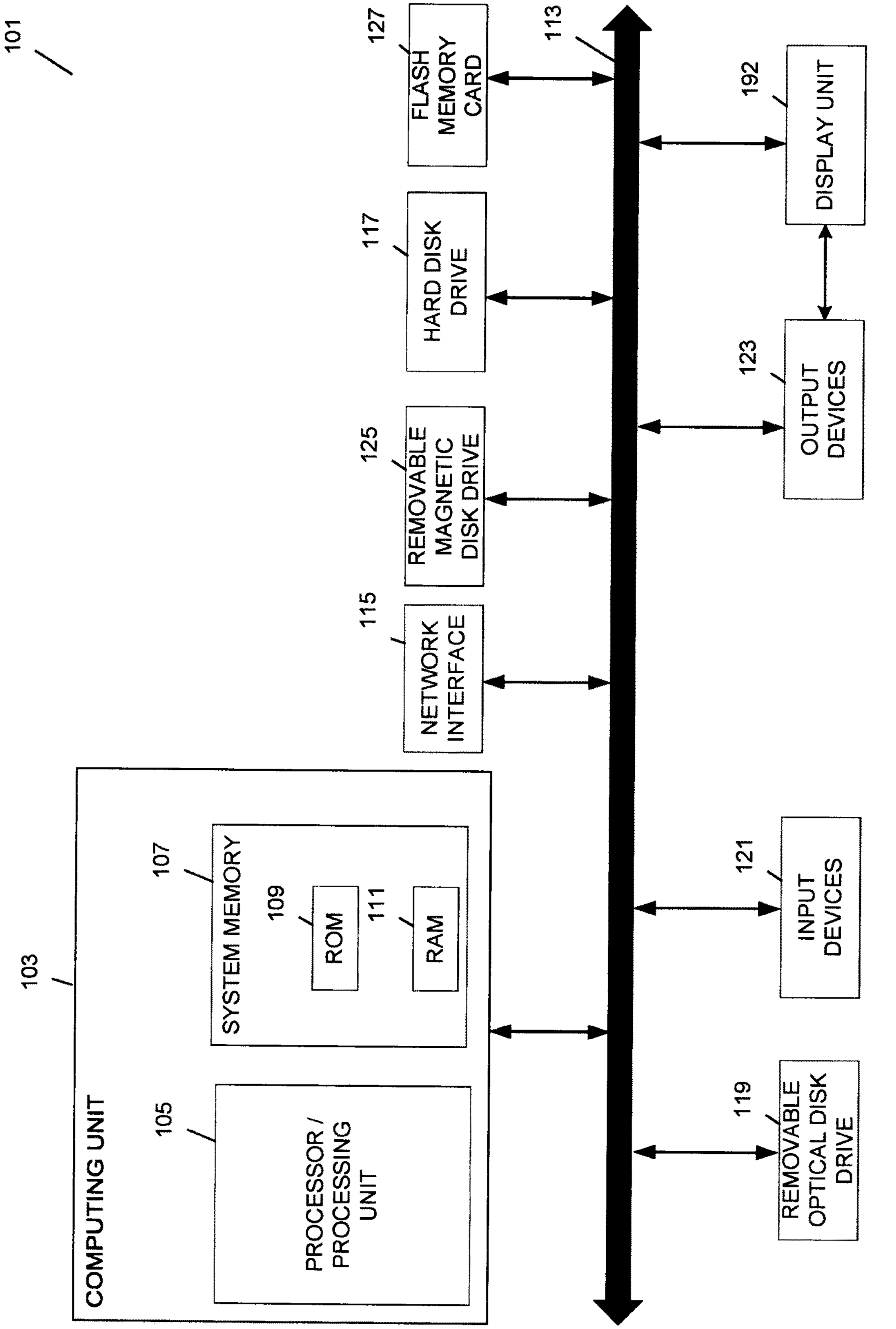
FIG. 1 shows a schematic view of an example of a programmable computing device/apparatus.

The disclosed methods and systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various systems and methods are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Throughout the following detailed description, commas or periods or other symbols used in punctuation, when appearing within quoted text, may exist for grammatical purposes. A comma or period, for example, may be a meaningful part of the quoted text or it may only serve to add grammatical accuracy to the containing sentence. The reader should understand the difference based upon context.

Various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

The following detailed description includes definitions of selected terms employed herein. The definitions include various examples and/or forms of components that fall within the scope of a term and that may be used to implement the disclosed methods. The examples are not intended to be limiting. Both singular and plural forms of terms may be within the definitions. The reader should further understand that definitions of some terms should be construed based upon context, so that industry-specific terms that also have generalized meaning in the English language shall be read with an industry-specific definition in their technical context and a general English definition outside of their intended technical context. For example, "field," per the technical definition hereafter, may refer to a unit of data in data structures, but "field" outside of data structure contexts may still be used in general English wordings herein to describe an area of open land or a field of study.

"Access a data storage," or like terminology, as used herein, includes accessing a data storage by direct or indirect means. Specifically, if a first application, or unit of software code, or hardware, is configured to access a data storage, it should still be deemed to access the data storage even if such is handled through a second software application, or second unit of code, or second piece of hardware, with which the first application, or unit of code, or hardware communicates. For example, in client-server architectures, or mobile application architectures, an application may communicate with a data storage via communication to code operating on the server, whereby the server code communicates with the data storage and the client application or mobile application communicates with the server; in such a scenario, the application should still be deemed to have access to the data storage. Accessing a data storage may occur both locally or over a wide area network, the networks being either private or public.

"API," as used herein, refers to an application programming interface. An API is a software intermediary or methodology allowing two computing programs or devices to communication with each other. Common APIs use standards and structure for communication, such as HTTP or REST protocols. APIs may also incorporate security measures to restrict access by token or other authentication mechanisms and/or encrypt data.

"Application," as used herein, includes but is not limited to a software program with a specific purpose. Applications may be web applications that include one or more of HTML layouts, scripts, compiled code, or other formats commonly used in hosted or client/server applications. Applications may be desktop applications. Applications may be software programs running on mobile devices. Applications may be known as "apps," such as, but not limited to, a communication app, a social media app, a messenger app or a task-specific business app, where the apps are downloaded from online stores operated typically by the publisher of an operating system, such as the Windows Store, or equivalent stores from Apple or Google or Amazon.com. Applications may be executed on clients, servers, or combinations thereof. Applications may be configured to access databases or other data references stored on servers, clients, or other network accessible computing devices. Applications may define hosted applications, hosted services, cloud computing applications, and/or additional or alternative technologies that provide software as a service (SaaS). An application may also be a hosted software program within a group of hosted applications included in a group of related applications defining a cloud software suite. The application code itself, in some but not necessarily all variations, may be stored on any type of non-transitory computer-readable storage medium or tangible computer storage device, such as hard drives, solid state memory, flash memory, optical disc, and/or the like.

"Application server," as used herein, incudes but is not limited to a computing device including a processor and configured to at least partially run one or more software applications. An application server may be configured to exclusively run or deliver to a client computing device a single software application or multiple software applications. An application server may be configured to deliver, and not execute on its own processor, computing code associated with a software application to a client computer or client computing device. In such situations, the client computing device may partially or fully execute the application code and the application server may execute only a partial portion or no application code. An application server may be a software framework instead of a dedicated computing device, where the software framework serves to execute computing code and/or deliver computing code to a client computing device. An application server may be a web server configured to serve applications. An application server may be a delivery framework to allow download of software applications to mobile and desktop operating systems. In such instances, thereafter download, the application may not utilize or communicate with the delivery framework for purposes of using the application. Types of application servers or application server frameworks are numerous and include, but are not limited to, Java application servers, Microsoft application servers, PHP application servers, Amazon cloud servers and services, Microsoft Azure cloud servers and services, and custom-created application servers or application server frameworks. An application server may even be an online store operated typically by the publisher of an operating system, such as the Windows Store, or equivalent stores from Apple or Google or Amazon.com.

"Caller ID," as used herein includes but is not limited to a stream of digits referring to an incoming caller's telephone number, or in the case of a Session Initiated Protocol (SIP) originating phone, the unique alphanumeric equivalent corresponding to the caller's number or address on the network and in such instances the use of the accompanying word "digits" (i.e. "caller ID digits") or "information" (i.e. "caller ID information") will be understood to equally refer to alphanumeric data. "Caller ID" may also be equally construed, or vice-versa, as "ANI" (Automatic Number Identification) which is a fundamentally equivalent term used more frequently amongst those within the telecommunications industry.

"Cloud," when used herein in a technical context shall be construed in the context of cloud computing. Cloud computing shall refer to the on-demand availability of computer system or communication resources, which may include processing and storage resources, or communication resources, among others. Cloud computing resources are commonly provided from a data center to an organization over the internet although private network cloud resources may also be available. Cloud computing resources may commonly be provided over the internet, with applicable security protocols implemented to secure the transmission of data. However, some cloud computing resources, such as heavy computational services, may not require any transmission of data beyond the original setup of such services or they may require just periodic communication, as is desired in a given architecture.

"Communication-As-A-Service," (CaaS) as used herein commonly refers to the concept of communication services provided by an entity to another entity, typically for ease of implementation. As one example, if entity one had term communications agreements with telecom carriers and expensive large-scale hardware to interface with a switched telephone network (STN), it could offer those services to entity two as a service such that entity two could minimize invested capital and time involved in offering those same services to its clients. In such a scenario, entity one often provides an API-based facility for entity two to control the services desired, often down to the hardware level where, for example, entity two can instruct via an API command that entity one answers a telephone call and/or obtains caller ID information. In these scenarios, the entity consuming the communication services is still often regarded similarly to the CaaS provider by those to whom it provides service.

"CNAM," as used herein is an acronym referring to a Caller ID Name. The standard CNAM utilization employs 15 characters, however, for the purposes of this disclosure, the actual length could vary. CNAM data may be obtained from one or more sources.

"Collection," as used herein, includes but is not limited to, a database, a database table, a set of records within a table or database, a list of items or entities, an array of items or entities, computer-formed dictionaries or any other grouping of data records or common variations of data collections. A collection may also be represented, in some instances, by the output of a structured query language (SQL) query.

"Data storage," as used herein, refers to a physical and/or logical entity that can store data. Data storage may be, for example, a computer containing a database, or simply a database, a table, a file, a list, a queue, a heap, a memory, a register, a file directory, a storage location, and so on. Data storage may, for example, reside in RAM memory and/or one logical and/or physical entity and/or may be distributed between two or more logical and/or physical entities. Data storage may be any currently known or later developed means for storing data in a computing environment, including memory local to an application server or remote memory in communication with the application server. A data storage may also include a local or remote cache server, a cloud-based data repository, a shared cloud-based data repository provided as a service, or an API-based service where data is stored within another party's database or data storage by this same definition. A data storage may also contain more than one collection of data. A data storage may be construed as a second data storage in some instances due to virtualization of database server technologies across a single machine by database software providers. A data storage may further have processing abilities to modify data elements before presentation, sometimes even using developer-definable computer software code methods to alter the output.

"Data Record," as used herein may, as an example, refer to a commonly-understood concept of a data record within the output of data from a database or data storage. A record is commonly referred to as a row. A row of data commonly contains columns or "fields" of data. A data record might, for example, contain 5 units of data pertaining to a person, such as first name, last name, phone number, email address and postal code. A data record could be the direct output of one table of data from a data storage or it could be the output of multiple tables of data combined into one row of filtered data, often through a querying language such as SQL (structured query language). A data record could even be derived from more one than collection of data or more than one data storage. Many methods of constructing the final output of a record are possible.

"Entity," as used herein, includes but is not limited to, a person, an organization, business, individual human contact of a business, customer, prospective customer, vendor, employee, contractor, associate, worker or any type of legal entity commonly a party to a business or legal transaction. The term "entities," as used herein, refers to the plural of "entity."

"Field," as used herein, within the context of data, data elements or data structure, includes but is not limited to, a data unit, commonly as a unit of a data record. For example, a field may be a person's first name or a company name or even an ID, stored as a unit of a record of data. Depending upon the context, the use of the term could refer to the data structure or the value within the structure, although usually the term "field" refers to the data value itself which we term a "data element." When referring to copying fields, the context would suggest the copying of the values within the fields. However, when referring to a schema of fields within a record within a table within a database, the context would suggest that fields refer to the structural component. A field may also be considered as a column in a commonly-structured view of data having one record of data per row.

"Providing" and "Provide" as used herein, includes but is not limited to direct action to provide by a party as well as indirect action through another party, such as having another party provide the indicated good, hardware, software, data storage, database, entity, service, etc. Particularly in instances of indirect provision, the reader should understand that the terms "providing" and "provide" may have a meaning more synonymous with "utilize". In the context of computer-based architectures, it should also be understood that providing may be done through cloud-based services, sometimes called "fabrics," which serve to perform a provision electronically on behalf of another party. Providing may be further performed by computing devices and services both locally or spread across one or more local or wide-area networks, in whole or in pieces, at one time or in separated portions over a period of time.

"Receiving device," as used herein, sometimes being labeled just "device," includes, but is not limited to, a computer or other electronic device configured to run software applications or a service front-end receiving information on behalf of another device. A receiving device may be a computing device with a processor partially or fully executing software instructions. For example, the computing device may be a desktop computer, a laptop computer, a mobile electronic device, such as a smartphone, a personal data assistant, a tablet computer, a server functioning as a computer, a database server, a database API front-end to a database, a watch, a server fabric functioning as a computing device, or even another API-based medium functioning as a front-end to an eventual computing device. The device may be any currently known or later developed technology.

"Record," as used herein, within the context of data structure, includes but is not limited to, a group of one or more data fields. For example, a record may contain fields which, together, describe an entity, such as a customer.

The term "Software-as-a-Service" or "SaaS," as used herein, includes but is not limited to software commonly executed partially or fully on servers which distribute over a network some component of the software (e.g. output of code execution), with or without accompanying client-side code, to an interface of a client computer or device. SaaS licensing models commonly involve subscriptions, paid or unpaid, by the owner or operator of the client device, or by an organization which subscribes on behalf of a multitude of members of the organization.

The term "software," as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servlet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners. The term "software," as used herein, may also generally refer to the type of software which is Software-as-a-Service.

"STN" or "PSTN" or "Switched Telephone Network" or "Public Switched Telephone Network" include, but are not limited to, telephone company/carrier networks which originate and/or terminate telephone calls. They may, for example, include old-fashioned networks such as copper-line analog networks or they may include more modern SIP (session initiation protocol) protocol networks or SS7 network or other forms of communications networks. They may further include communication-as-a-service offerings without the need for connecting parties to integrate hardware. They may further include the networks, physical or virtual, of resellers to the underlying networks transporting the actual data (e.g. voice and caller ID information) associated with telephone calls. Networks may be private or public or some combination, thereof.

"Telephonic apparatus," or "telephone apparatus," or "telephonic framework" or "telephonic switching and computing framework," as used herein, includes but is not limited to, a telephone switch, a computer, a computer telephony device, or combinations thereof. The words "telephone" and "telephonic" may be interpreted interchangeably herein, particularly when used as a modifier before the words "apparatus" or "framework." While, historically, telephonic switching was performed with industrial-grade hardware manufactured very specifically for the function of switching or bridging inbound and outbound calls, over analog or digital phone lines, newer computer telephony technologies have allowed computers to have a role in the processes of telephonic switching, from or to public or private switched telephone networks. Some computers accept telephonic add-on cards to serve the role of telephonic switching but, particularly with much communication now utilizing the SIP protocol, which can be employed by computers having ethernet ports, computers can also be deemed as telephonic devices without any add-on cards. A telephonic framework or telephone apparatus may, for example, involve a combination of a dedicated telephonic switching device and a computer, or in other instances, a combination of computing devices for network and data operations alongside a computer or telephonic switching device for telephony purposes. In fact, many telephonic frameworks or apparatuses today are computers running specialized software to execute telephonic functions. A telephonic framework or apparatus may also incorporate text-to-speech functionality entirely within the apparatus or help effect the outcome of spoken speech by utilizing internal abilities to play sounds within the apparatus alongside external conversion mechanisms to convert text to speech sounds. A telephonic framework or apparatus may be considered as a telephone switching framework for connecting inbound and outbound legs of telephone calls, or vice versa, the framework being either software or hardware, or a combination thereof. A telephonic framework or apparatus may have various forms. A telephonic framework may utilize the same hardware as a computing apparatus and a single piece of hardware could perform the functions of both a telephonic framework and a computing apparatus serving other functions (e.g. those of a web server, transmission of data to a device, or storing data to a data storage). A telephonic framework may also be a communications-as-a-service framework or "fabric" and/or cloud-computing framework or "fabric," provided remotely over a network.

"Trigger," as used herein refers to a non-physical trigger, such as an event-based trigger to perform a task. A "trigger," as used herein, would not refer to a physical lever or physical, mechanical switch, however, to the extent that a physical trigger may cause an event to occur within an electronic or data framework, that would be deemed a valid "trigger," as used herein; for example, if a caller hangs up an analog telephone, which closes a circuit as a physical switch, a trigger would be not be deemed as the switch closure but rather it would be deemed as the reporting via a data event on a telephone network of a call hangup occurrence. Similarly, a click of a user interface may raise an event in software, the event being the trigger. A trigger may also be a collection of multiple triggers which collectively could still be referred to a single trigger.

"User," as used herein, includes but is not limited to, a person, computer, device, entity or software which interacts with or uses a software application or device, including use by proxy. A user may be an individual acting on behalf of an organizational entity, such as a person performing work for a company, or a user may be considered as the organizational entity itself, such as the company.

"User interface," as used herein includes but is not limited to the visual part of a software application through which a user interacts with the software application. A user interface may include an interface object or a series of objects displayed on a display unit. For example, a user interface may represent a group of elements such as a menu bar, a table or other data list, selection controls, and a submit button. A user interface may be display within a web browser or a user interface may be deemed to include the web browser itself.

Accordingly, FIG. 1 shows one illustrative example of a computer 101 that can be used to implement various embodiments of the invention. Computer 101 may, for example, be a server, such as a telephony server, an application server or a database server. Computer 101 may, for example, be a client computer with a display, configured to execute a web browser. Computer 101 may, for example, be a mobile device. Computer 101 may, for example, be incorporated within a variety of consumer electronic devices, such as personal media players, cellular phones, smart phones, personal data assistants, global positioning system devices, and the like.

As seen in this figure, computer 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated by those of ordinary skill in the art, both read-only memory (ROM) 109 and random access memory (RAM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, and a flash memory card 127. Processing unit 105 and system memory 107 also may be directly or indirectly connected to one or more input devices 121 and one or more output devices 123. Input devices 121 may include, for example, a keyboard, touch screen, a remote control pad, a pointing device (such as a mouse, touchpad, stylus, trackball, or joystick), a scanner, a camera or a microphone. Output devices 123 may include, for example, a display unit 192, such as a monitor display, an integrated display, or a television; a printer; a stereo; or speakers.

Still further, computing unit 103 will be directly or indirectly connected to one or more network interfaces 115 for communicating with a network. This type of network interface 115, also sometimes referred to as a network adapter or network interface card (NIC), translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. A network interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage functions, or some combination thereof. For example, the computer 101 may be connected to telephony hardware for interfacing with STNs.

Computer 101 may be connected to or otherwise include one or more other peripheral devices, such as a telephone. The telephone may be, for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, MMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 101 so that their data maintained may be synchronized.

Of course, still other peripheral devices may be included with or otherwise connected to a computer 101 of the type illustrated in FIG. 1, as is well known in the art. In some cases, a peripheral device may be permanently or semi-permanently connected to computing unit 103. For example, with many computers, computing unit 103, hard disk drive 117, removable optical disk drive 119 and a display are semi-permanently encased in a single housing.

Still other peripheral devices may be removably connected to computer 101, however. Computer 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computer 101 may include a wired data "port," a wireless data "port," such as a Bluetooth® interface, a Wi-Fi interface, an infrared data port, or the like.

It should be appreciated that a computing device employed according various examples of the invention may include more components than computer 101 illustrated in FIG. 1, fewer components than computer 101, or a different combination of components than computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

In many examples, computers may define mobile electronic devices, such as smartphones, tablet computers, or portable music players, often operating the iOS, Symbian, Windows-based (including Windows Mobile, Windows Phone, or Windows RT), or Android operating systems.

Figure 2:
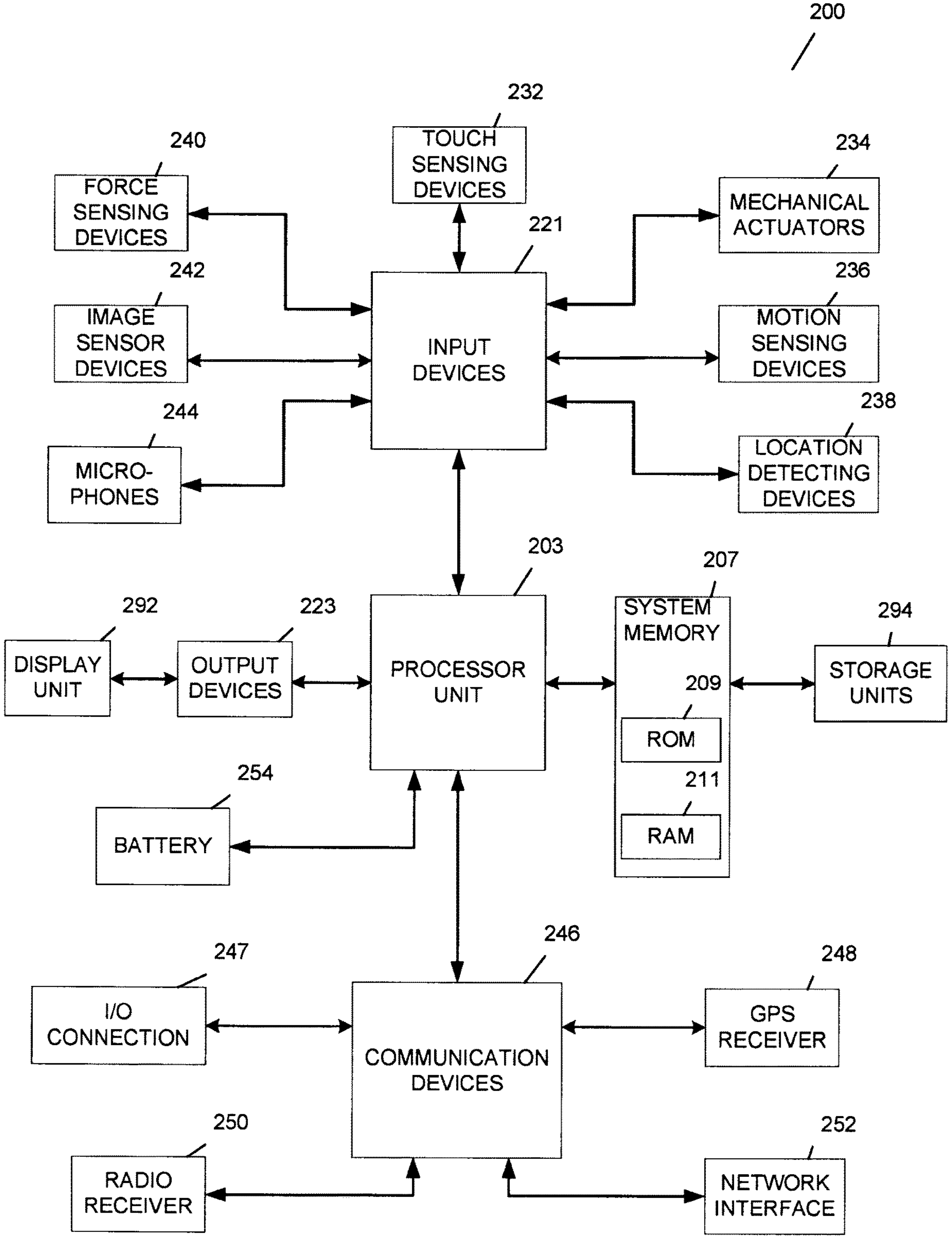
FIG. 2 shows a schematic view of an example of a mobile electronic device, a sample receiving device of data.

With reference to FIG. 2, an exemplary mobile device, mobile device 200, may include a processor unit 203 (e.g., CPU) configured to execute instructions and to carry out operations associated with the mobile device. For example, using instructions retrieved for example from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc.

In most cases, the controller together with an operating system operates to execute computer code and produce and use data. The operating system may correspond to well known operating systems such iOS, Symbian, Linux, Windows, Mac, or Android operating systems, or alternatively to special purpose operating system, such as those used for limited purpose appliance-type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211. Further, system memory 207 may retrieve data from storage units 294, which may include a hard disk drive, flash memory, etc. In conjunction with system memory 207, storage units 294 may include a removable storage device such as an optical disc player that receives and plays DVDs, or card slots for receiving mediums such as memory cards (or memory sticks).

Mobile device 200 also includes input devices 221 that are operatively coupled to processor unit 203. Input devices 221 are configured to transfer data from the outside world into mobile device 200. As shown, input devices 221 may correspond to both data entry mechanisms and data capture mechanisms. In particular, input devices 221 may include touch sensing devices 232 such as touch screens, touch pads and touch sensing surfaces, mechanical actuators 234 such as button or wheels or hold switches, motion sensing devices 236 such as accelerometers, location detecting devices 238 such as global positioning satellite receivers, WiFi based location detection functionality, or cellular radio based location detection functionality, force sensing devices 240 such as force sensitive displays and housings, image sensor devices 242, and microphones 244. Input devices 221 may also include a clickable display actuator.

Mobile device 200 also includes various output devices 223 that are operatively coupled to processor unit 203. Output devices 223 are configured to transfer data from mobile device 200 to the outside world. Output devices 223 may include a display unit 292 such as an LCD, speakers or jacks, audio/tactile feedback devices, light indicators, and the like.

Mobile device 200 also includes various communication devices 246 that are operatively coupled to the controller. Communication devices 246 may, for example, include both an I/O connection 247 that may be wired or wirelessly connected to selected devices such as through IR, USB, or Firewire protocols, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable means for transmitting data over a computer network.

Mobile device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations of the invention described above can be used alone or in various combinations. The methods of this invention can be implemented by software, hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer and/or telephonic systems so that the computer readable code is stored and executed in a distributed fashion.

Figure 3:
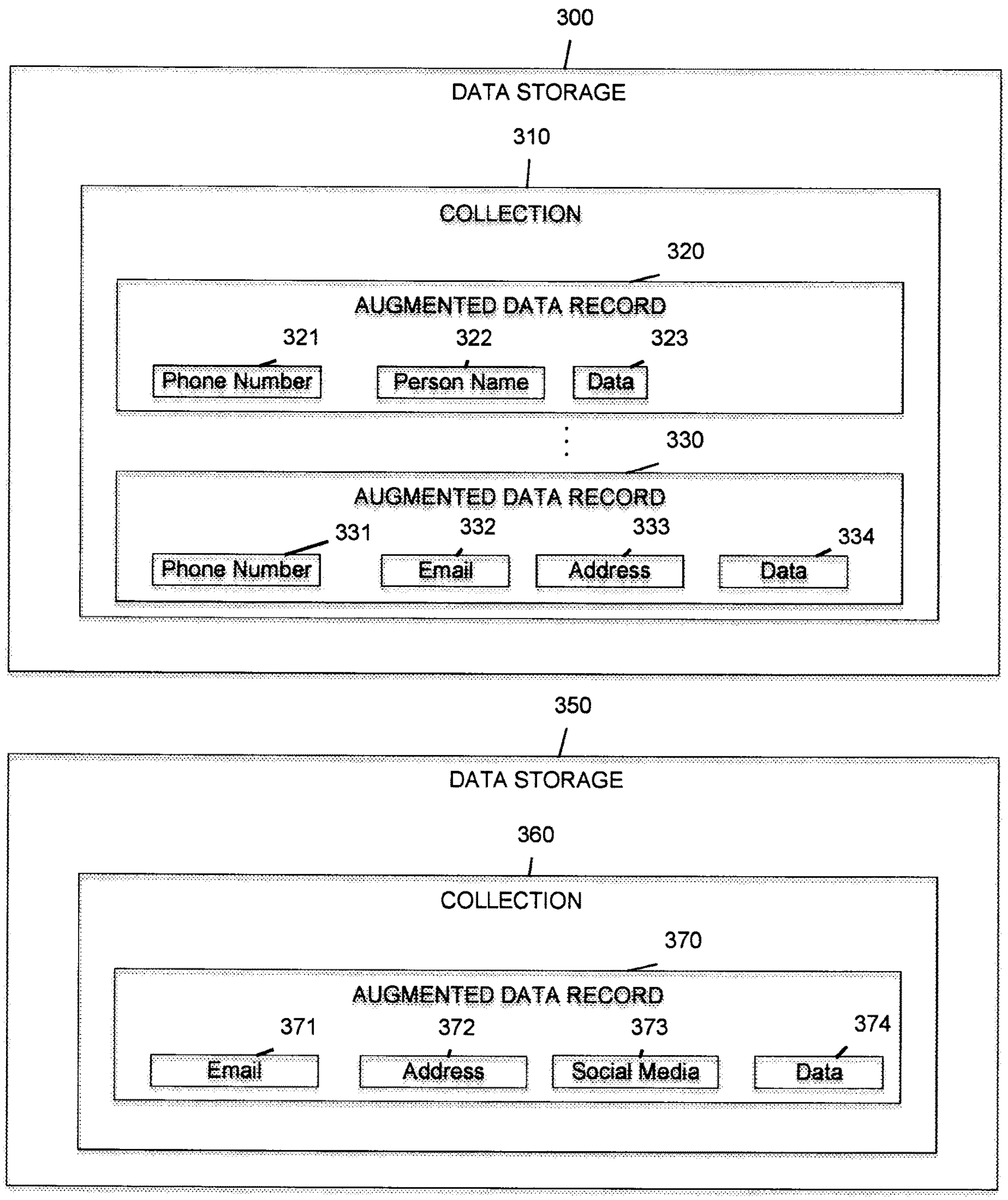
FIG. 3 shows a diagrammatic view of an example of two data storages, each having a sample collection, the respective collections having one or more records, the records having multiple data elements.

FIG. 3 represents two example data storages. There are many possible types and numbers of data storages. The example data storage, data storage 300, includes a data collection 310. The example data storage 350, an optional secondary data storage, includes a data collection 360. FIG. 3 fundamentally illustrates that the number of data storages may vary as may the data contained with each collection and each record.

Collection 310 illustrates a collection of augmented data records, which are likely records associated with entities, such as example record 320 and an example record 330, the latter reflecting a different example layout of data. Each entity record 320 or 330 may contain a phone number corresponding with an entity. When the data storage 300 includes or consists of a transactional database, a phone number 321 and 331 is often, but not necessarily, referred to or kept as a primary key, but alternatively a primary key may exist alongside the data in the entity record. Each example entity record 320 or 330 also provides one or more data fields. Entity record 320 depicts augmented data elements, such as a phone number 321, a person's name 322 and potentially one or more data field(s) 323 including, as examples, an entity alternative name, an entity address, one or more other entity phone numbers, or an entity email address. Example entity record 330 depicts augmented data elements, such as a phone number 331, an email address 332, a physical address 333, and potentially one or more other data field(s) 334. The data in such entity records 320 or 330 may be stored within the data record or outside of the data record. For example, for this or any collection, in the case of a transactional database, a normalized database pattern may store one piece of data in a parent record and other piece(s) of data stored in child record(s) mapped together by matching key or data field values. For the purposes of this illustration and disclosure, the organization of data fields within or associated with a data record is understood to be potentially varied and this illustration reflects just one possible organization method of the actual data layout. It is also possible in some variations that some portion of the depicted data is stored in one collection in one data storage while another portion may be stored in another collection in another data storage, even operated at different geographic locations or accessible via an API or other methods of reaching data.

Collection 360 illustrates another collection of augmented data records, which again are likely associated with entities such as people. Example augmented data record 360 depicts augmented data elements for an entity's email address 371, an entity address 372, a social media profile URL 373, and potentially other data 374.

It is noteworthy that example data collection 360 is within a different data storage 350 than data storage 300. Although the data storages could reside on the same device at the same location, in one variation, for example, the data storages could be at two different geographic locations. In another variation, the data storages and their respective collections of records and elements could be sourced from two different vendors of data. In another variation, one data storage could take the form of a database on a local physical server whereas a second data storage could take the form of an API-based data storage sourced from a paid data vendor. In yet another variation, both data storages could be virtual and provided as part of a cloud service offering or cloud fabric/infrastructure offering.

Augmented data record 320 and data record 330 both depict having a phone number data element, such as data element 321 or data element 331. Data record 320 depicts the phone number data element being associated within its own record with a person's name data element 322. Data record 330 also depicts the association of a phone number 331 associating with the same data record with an exemplar data element, email 332 and address 333. The data layout and associations made within the data record would depend upon the schema and content of the utilized data record, such as the schema in augmented data record 320 or that in augmented data record 330.

Although augmented data records, such as augmented data records 320, 330 and 370 may potentially contain augmented data elements which are present in the caller ID information, as part of an overlap of data values across records, an augmented data element having value to the implementation may be considered as one which is not present in the caller ID information transmitted from the STN (switched telephone network). Furthermore, an augmented data element, such as one of augmented data elements 322, 323, 333, 334, 371, 372, 373, 374, is not likely data obtained verbally from the caller, including from voicemail messages, on this or prior calls, but rather data which can be obtained and associated without such.

Augmented data record 370 illustrates a schema of augmented data elements. This schema notably does not contain a caller phone number to be readily associated with further data. However, one could make a transitive leap in joining data for the same entity, such as a person, by associating the phone number data element 331 with the email data element 332 in that same record and then bridging to other data, such as social media data element 373, by forming an association between the email data element 332 and the email data element 371. As, in this example, an email address is typically a unique identifier for an entity, it is reasonable to associate the data in augmented data record 330 with the data in augmented data record 370 when the email address is the same. By doing so, one could further augment caller ID telephone number information to infinitely more data associated with the underlying entity, leaping across infinitely more data storages and data collections and data records. In one possible variation, the joining of data records could be performed by using SQL (structured query language), a technique routinely utilized to join data on one or more matching data elements (fields). In another possible variation, the email data element 332 could be first identified from the caller phone number 332 and then passed as an input requirement to an API-based service sample data storage 350, the service operator then computing a returned, filtered data collection 360 having just one data record 370 containing the match of associated data where the email address 371 matches the provided input which was obtained from the email data element 331.

To improve accuracy in augmenting data, the implementer could attempt to match two data elements instead of one data element when making an association. As an example, the caller ID phone number could first be matched to the phone number data element 331, which could then provide the immediate association to that phone number of email data element 332 and address data element 333. Those two values from data elements 332 and 333 could be used in a join operation to locate and associate with the data contained in the data elements of data record 370 found in a different data storage 350. By filtering the collection 360 on two inputs (data fields) instead of one, the likelihood of ensuring that the additional data found in data record 370, such as social media data element 373, belongs to the same entity is increased.

Architecturally, there are numerous possible variations of such data organization and data sourcing techniques. A database architect could even have temporary tables to hold entity data before eventual transmission or storage elsewhere of that data. There are numerous architecting methodologies which may be employed.

Referencing FIG. 3's sample architecture again, in other variations of a data storage architecture, the provider of the data storage and underlying data could be different than the transmitter of such data.

There is also enormous variability in the types of data stored in collections such as example collection 310 and collection 360. The types of data sourced for the purposes of augmentation could vary widely with the implementer's desires and industry.

In other variations, it is possible that more than one collection 310 would be made available to a software application. Some collections could be specific to a subscribing organization, but such is also not required because database filtering technologies easily allow an application to obtain the applicable records without collections being formed per each subscribing organization.

Figure 4:
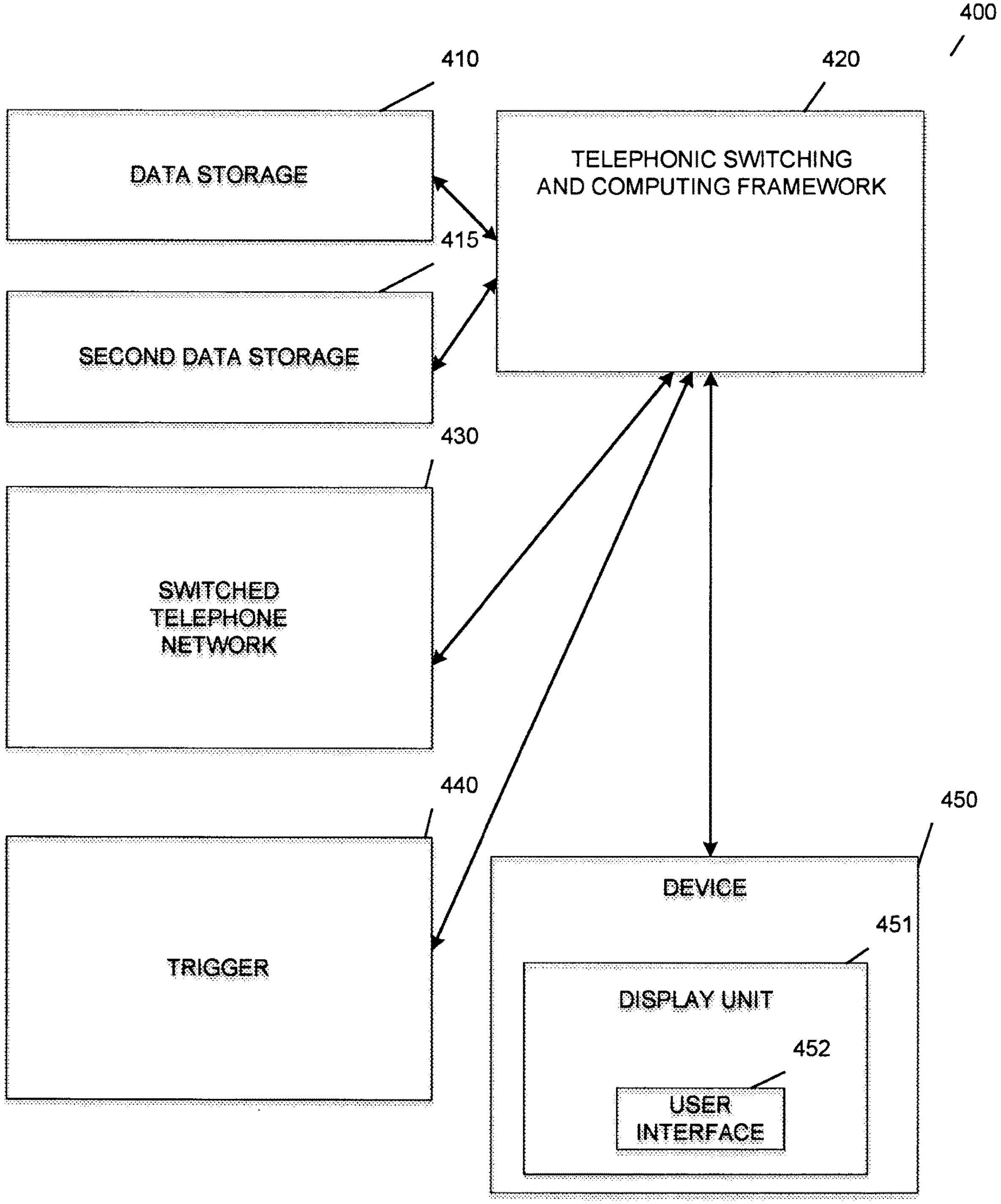
FIG. 4 shows a diagrammatic view of an example telephonic switching and computing framework, two example data storages, a switched telephone network, a non-physical trigger, and an example receiving device having an optional display unit and user interface.

In FIG. 4, we can see an example view 400 of a data storage 410, a sample second data storage 415, a telephonic switching and computing framework 420, a switched telephone network 430, a trigger 440, and a receiving device 450. The data storage 410 and data storage 415 could be representative of the data storages described in FIG. 3, but here represented from a broader perspective to show its relationship with other elements in an example architecture.

A data storage, such as the data storage 410, much like other elements of the invention, in some configurations, could represent a data storage operated by the implementer or, in other configurations, represent one operated by another party and simply utilized by the implementor. Furthermore, in instances where more than one data storage is utilized, it is possible for an implementor to directly provide a data storage containing a collection and also to indirectly provide and utilize another data storage containing a collection. For example, an implementor could directly provide the data storage and a database with a collection and/or indirectly utilize a data storage containing a collection across the internet.

Example data storage 415 is an optional additional data storage used in some variations as previously described. For example, some augmented data could be located in a first data storage and then using that information, a further association could be made with augmented data in a second data storage. In other variations, one or more data storages could also be used to store data. The data received from the receiving device after transmission of augmented data could be stored in one or more data storages such as data storage 415.

A telephonic switching and computing framework 420 represents a combination of hardware or software, as there are many theoretical combinations depending upon the technologies employed. One example telephonic switching and computing framework 420 could consist of a computer telephony server having a SIP (session initiation protocol) connection to the switched telephone network 430 to receive caller ID information, answer a call, and perform telephony functions on that call, and an Ethernet data connection to data storages, the public internet, and a receiving device 450, with the computer telephone server functioning additionally as a computing device 422 such as an application server executing software code to perform tasks. Another example telephonic switching and computing framework 420 could consist of a dedicated telecommunication switch which communicates with a computing device 422 such as a computer server configured to execute software code.

Another example telephonic switching and computing framework 420 could be solely a dedicated telecommunication switch configured to transmit data without the use of additional hardware. Another example telephonic switching and computing framework 420 consists of a computer server configured to accept telephone calls and transmit data over a network. Another example telephonic switching and computing framework 420 consists of a computer telephony server working in conjunction with a cloud-based service configured to execute software code. Another example telephonic switching and computing framework 420 consists of telephonic and computer processing being performed by communication-as-a-service and other cloud-service platforms configured to answer telephone calls and execute software code; in such instances, cloud offerings invariably utilize hardware at some point in the process despite the appearance to the contrary which is resultant from geographically separate apparatuses in the architecture. There are many possible combinations of hardware and software which could be employed to constitute a telephonic switching and computing framework.

The telephonic switching and computing framework 420 can often be deemed to be a telephonic switching and application server framework in concept. Historically, dedicated hardware telecommunications switches had limited computing abilities outside of the scope of call processing and could not execute custom software. Over time, the function of computers has grown within the computer telephony industry to encompass call processing abilities and the telephone networks have often moved from dedicated telephonic circuits to the utilization of Ethernet networks. As such, the differentiation of computers and dedicated telecommunications switches has blurred, often with one device encompassing the task of another. Compounding such blur is the offering of communication-as-a-service (CaaS) platforms which can allow for call processing via APIs and other methods of software code incorporation, such as the execution of XML (extensible markup language) web pages on servers over the internet to further instruct CaaS platforms to perform a telephonic task, such as answering a call, retrieving caller ID information, accepting digits from a caller, playing or recording audio, synthesizing speech, terminating a call, etc. These CaaS platforms may be architecturally incorporated alongside local or remote computing devices or even alongside other cloud-based service configured to execute code. The difference in whether one chooses one architectural model or another can be based upon cost, control of the network, security, software code flexibility, ease of implementation and other factors.

The telephone switching framework 420 is configured to access the switched telephone network 430 and data storages 410 and 415, along with the receiving device 450, via one or more network connections. A network connection could be a local area network connection, or a wide-area-network connection. A wide-area-network connection could include network connectivity over a private network serving more than one geographic location or it could represent the Internet, or a combination thereof. Network connections could be wired or wireless. Network communications could occur in many theoretically different ways, with any of the now-known or later known network communications models, including, for example, using the TCP/IP or HTTP protocol over Ethernet network connections.

Data communication may be structured with, for example, Extensible Markup Language (XML). XML may be used as part of a Simple Object Access Protocol (SOAP). Representational State Transfer (REST) is another possible protocol that could be used. JSON formatting of data structures to transmit data could also be used. Unlike these generally open standards for communications, closed proprietary communication methods or protocols could also be used, such as those used by Microsoft SQL Server or Oracle database technologies. Many open or closed communications protocols or structures would be suitable and the architect of the solution must choose a method appropriate for the application.

Data communication with the data storage 410 may be encrypted. Data communication may involve client/server authentication to ensure access to the data is allowed by the telephonic switching and computing framework 420 or the receiving device 450, as examples.

Communication with the switched telephone network 430 may occur via one of many protocols and network connect types. Some older networks use copper wire connections and communicate via proprietary telecommunications protocols. Other networks may use a standard Ethernet connection and communicate with the SIP (session initiation protocol) protocol. Other example networks may use optical cable and one of many data communication protocols.

The computing device 422 as part of the telephonic switching and computing framework 420 could communicate with the data storage 410 or a second data storage 415 and execute software code, the software code being configured to transmit data to a receiving device. Computing device 422 could even be configured as a web server, transmitting to receiving device 450 upon user request of a web page, as one possible example. Computing device 422 may or may not be located within or near the rest of the telephonic switching and computing framework 420 and it may not be a subset of the telephony-specific portion of the overall telephonic switching and computing framework 420. Computing device 422 could be a standalone device or internet-based computing service operating at a different geographic location from the rest of the framework, maintaining communication over a private or wide area network, such as the internet. A computing device 422 acting as a web server may function as an application server and deliver an application to a client computer acting as a receiving device 450 where the application reads some data directly from the data storage 410, while other data is retrieved from a second data storage 415. The number of applications and/or client computers could be different in various configurations.

As depicted in FIG. 4, a trigger 440 determines the point at which augmented call data is transmitted to receiving device 450. The augmented call data could be transmitted to a device for reasons including, but not limited to, storage or viewing and the call data could be transmitted for one or multiple records at one time.

The trigger 440 could, in one variation, represent the receipt of the caller phone number information from the switched telephone network 430, which often occurs immediately prior to or simultaneous with the start of an inbound telephone call, although sometimes during a call. In another variation, the trigger could be the conclusion of an inbound phone call. In another variation, the trigger could be a time delay after the event of another trigger has occurred. In another variation, the trigger could be the request of a web page or application screen from the user on the receiving device 450, requesting augmented data associated with a current or prior telephone call. In another variation, the trigger could be the execution of code configured to display prior call data. In another variation, the trigger could be a user click on a web page to signify the user wishes to see augmented data associated with caller phone number information. In another variation, the trigger could be the execution of code within the telephone switching framework configured to save data associated with an incoming call. In another variation, the trigger could be the telephonic and computing framework having placed caller ID information in a pickup location being monitored by another task which is then prepared to search for augmented data. In another variation, the trigger could be a time-based event such as when a defined clock reaches midnight each day.

In some variations, upon receipt of the trigger 440, augmented data will then be transmitted to receiving device 450. Transmission may commonly occur over a data network, either a LAN or WAN or public internet, and commonly using the TCP/IP protocol with encryption. A data network could be one or more networks, locally or separated geographic, as is common in data architecture. In any event, multiple methods exist for transmitting data.

In some variations, trigger 440 could originate from an action or event on receiving device 450. As one example, a user of receiving device 450 could click on an element of a user interface to create a trigger event which could be transmitted over the data network.

Receiving device 450 could be a computing device, such as a smart telephone or computing tablet or a dedicated computer or computer server or database server or an API-based service acting as the front-end communications gateway for an eventual device. A receiving device 450 may, for example, be further configured to display data but it may also be configured to store data or use the data for further processing.

In some configurations, the receiving device 450 may optionally have integrated within it or have attached to it a display unit 451. An example display unit could be the screen of a mobile smart telephone, the screen of a tablet computer, the screen of a watch, the screen of a laptop computer, the screen of a generalized computing device or an attached monitor on a computer.

In some configuration, the receiving device 450 may optionally have a display unit 451 further displaying a user interface 452. The user interface 452 could, for example, be a graphical user interface (GUI) displaying both the caller phone number and augmented data associated with the caller phone number. The user interface 452 could optionally be configured with user input buttons or controls which allow a user to further execute a task associated with one or more nearby augmented data elements. A user interface 452 could display one or multiple records of data. A user interface 452 could be displayed, for example, as static data or moving data, or as a text message, or as a push notification on a mobile device, or as an application screen of an installed non-mobile software application, or as an application screen of a mobile app, or in HTML format as a web page on a browser. There are many possible implementations of a user interface, in terms of the type of device on which they are shown, whether they are or are not associated with an application, the data they display and the artistic design/layout of the data and user input controls being displayed.

In some examples, the computer executable code executed by a telephonic switching and computing framework 420 and/or a receiving device 450 may be written in languages such as custom telephony languages, C#, Java, JavaScript, PHP, or Ruby and implement server-side technologies like ASP.NET or CGI on a virtual or physical application server. In examples where the application server primarily executes the computer executable code, the computer executable code transferred to the client computer includes browser executable code.

The browser-executable code may include plain HTML and image files providing a cloud-accessible interface allowing users to operate the applications provided by the server-side applications. In particular, examples that are partially or primarily executed on the server side may be particularly suitable for cloud computing contexts. In some examples, the server side applications can access and manipulate local state data memory, such as by including cookies in the computer executable code transferred to the client computer.

In some examples, the computer executable code is configured to be executed partially, primarily, and or wholly on a device within the telephonic switching and computing framework 420 and/or a receiving device 450.

Figure 5:
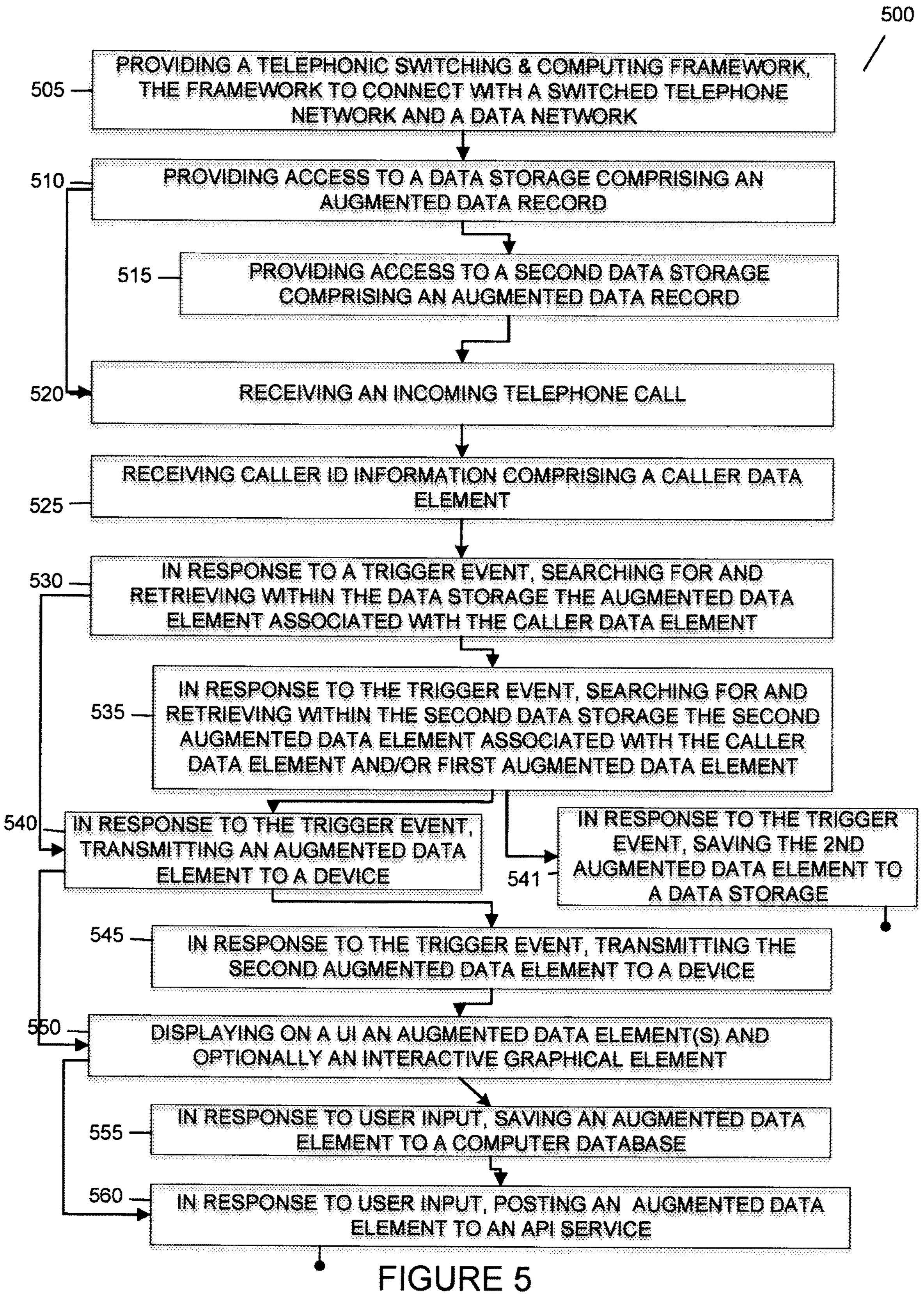
FIG. 5 is a flow diagram of an example of a method for augmenting caller ID information with additional data in response to a trigger event and transmitting an augmented data element to a device, optionally with further display and user input on such device.

With reference to FIG. 5, an example of a method for augmenting caller ID information with additional data in response to a trigger event and transmitting an augmented data element to a device, optionally with further display and user input on such device, method 500, will now be described.

As FIG. 5 shows, method 500 includes, at step 505, providing a telephonic switching and computing framework. This framework was described in the explanation for FIG. 4 and/or in reference definitions herein.

Method 500 then, at step 510, includes providing access to a data storage comprising an augmented data record. Data storages may be as described in the explanation for FIG. 4 and/or in reference definitions here. A telephonic switching and computing framework may have access to a data storage via a data network. The network may, for example, be local or remote, including over the internet. The access may be governed by security and encryption protocols readily familiar to those familiar with data access. In one example, a telephonic switching and computing framework in step 505 may be a computer telephony server configured to have access in step 510 to a database containing phone numbers and augmented data associated with those phone number. In another example, a telephony communication-as-a-service platform is configured in step 505 to be able to answer calls from a switched telephone network and raise an event to a web server which in step 510 is configured to access a data storage, which, as an example, could be a data storage accessible via an API using software code.

Step 515 includes providing access to a second data storage, the second data storage, for example, containing additional augmented entity data not available in the first data storage.

At step 520, the telephonic switching and computing framework receives a telephone call on what would be deemed an inward basis to the framework. In an example variation where the telephonic switching and computing framework is comprised of computer telephony hardware, device drivers for the interfaces to the switched telephone network will raise an event to the software governing the apparatus to signal the presence of an incoming call. In any example variation where the telephone switching and computing framework is comprised of a communication-as-a-service platform, the platform may raise an incoming call event to a web server configured to detect an HTTP POST to a designated web page. Other variations are readily available.

At step 525, caller ID information, including and sometimes limited to a caller phone number, is passed from the switched telephone network to the telephonic switching and computing framework. In one variation, the switched telephone network interface to the telephone switching and computing framework may dictate a protocol of sending the caller ID telephone number associated with the incoming call in step 520 as DTMF (dual-tone multi-frequency) digits. In another example variation, a communication-as-a-service platform which answers calls on behalf of an implementer could pass the caller ID telephone number via an HTTP POST to a designated web page on a web server and the web server could parse out the caller ID phone number in software code.

At step 525, the caller ID information can be passed in different formats. In one example, a caller ID telephone number for a caller in the United States (which utilizes country code 1) may be presented in the format 1xxxYYYYYYY, where "1" signifies the caller's country code, "xxx" is a numeric reference to the caller's area code within the United States, and "YYYYYYY" signifies the 7 digit phone number within the area code. A true numeric example thereof could be "12125551000". In another example, the phone number could be presented in the E.164 international telephone numbering plan standard, which for the same number may be +12125551000. In another example, the country code may be passed separately from the rest of the number. In another example, the country code and/or remaining digits of the phone number may be presented with formatting characters including parentheses and dashes. Utilizing software and computing abilities of the telephonic switching and computing framework, the number's format can readily be changed in internal memory before searching for that number in a data storage in an upcoming step.

Additionally, at step 525, caller ID information may, for example, be received as automatic number identification (ANI) or any other form that reflects the originating caller's phone number or address. In the cases of some digital devices, such as SIP-based devices, a caller ID number may be an address consisting of alphanumeric characters.

At step 530, the telephonic switching and computing framework responds to a trigger event. A trigger, as also defined and described herein, could commonly be the event which signaled the start of the telephone call to the framework. In response to such a trigger, the telephone switching and computing framework shall search for and retrieve within at least one data storage augmented caller/entity data where the caller ID telephone number, possibly then in an equivalent but changed format, matches the telephone number in an augmented data record.

At step 530, a search may commonly be made with Structured Query Language (SQL) to retrieve the desired records from a database such as Microsoft SQL Server or Oracle, but other methods of data retrieval may be employed. The search result may, for example, return an augmented data record corresponding to "John Smith," having a "2125551000" telephone number and an address of "1234 Main St, New York, NY 12345". Similarly, as another example, a search could be performed via an API-based lookup service into a remote data storage.

At step 535, additional augmentation may optionally be performed. In one example variation, the same caller phone number could be searched and identified within at least one data record in a second data storage and then the record containing augmented data could be retrieved from that second data storage. In another example variation, an augmented data element, such as an email address, retrieved from a first search in a first data storage could be used to further match against a data record associated with the same entity in the same first data storage or a second data storage, within a different collection of data records. By continuing to extend augmentation practices from one data record to another data record, using typically unique identifiers associated with an entity (e.g. address or email address or government ID number) to effectively join data, an implementer could construct a large set of augmented data elements all associated with the same entity even where many of the data collections no longer contain the entity's telephone number as was presented in the original caller ID information.

At step 530 or step 535, the implementation could also utilize another portion of the caller ID information presented in step 525, in lieu of using a caller's phone number. As an example, data association and augmentation could be performed with CNAM (caller name) information, although such may not be as unique or desirable as utilizing a caller's telephone number.

At step 540, in further response to the trigger event, the telephonic switching and computing framework transmits one or more augmented data elements to a receiving device over a data network. As one example, if augmented data elements "John F. Smith" and "1234 Main Street, New York, NY 12345" and "65 degrees and rainy" were associated with original caller ID telephone number "12125551000" then such may be transmitted along with the original caller ID telephone number to a mobile telephone via a push notification to an installed mobile telephone software app, where the app has been installed from a mobile app store. In another example, the augmented data elements, perhaps without the original caller ID telephone number, could be sent in an SMS (short message service) or MMS (multimedia message service) message to a mobile telephone device configured to received notifications for the incoming calls to a particular number on the telephone network; in such an example, the receiving mobile phone device's telephone number could be associated in a database with the dialed number (DNIS) from the original telephone call, such that this receiving device desires to receive augmented caller data associated with each call to the particular dialed telephone number. In another example, the augmented data elements could be sent to an email address, which fulfills the same purpose as sending to a receiving device as the email service is a receiving device and furthermore a person operating the email address would later pick up the email message on a receiving device. It can be further considered that when transmitting augmented data elements by methods such as, but not limited to, an SMS or MMS message or an email message, that a URL may be used in such a message to further link the recipient to a different medium more conducive to reading the augmented data elements, such as a web browser. In such an example scenario, the telephonic and computing framework could further output a web page, possibly from a web server, with augmented data upon the click of the URL in the message.

At step 540, in another variation, if the telephonic switching and computing framework were configured to present the caller with an auto attendant menu, and the caller were to choose an extension number of their desired party, and the trigger was the completion of the caller input to enter an extension of their desired party, and if the framework was configured to associate different receiving devices with different dialed extensions, and the receiving device is operated by the person whose extension has been dialed, then only the applicable person being dialed from the auto attendant menu would receive the transmission of augmented data.

At step 540, the transmission could be performed via various means. The transmission, as an example, could be sent as a mobile phone message, as a push notification, as a raw data packet sent over an Ethernet network, as an API-based POST to a front-end API service operating on behalf of a device or virtual device, as a web page, or via other means available to data communication over a network. Transmission could also occur, in some variations, where the telephonic switching and computing framework transmits or saves the data to a data storage for pickup by the receiving device at a subsequent time; this type of "left this for you" delivery mechanism, additionally requiring a retrieval by the receiving device, shall still constitute transmission and be deemed as an alternative method of transmission. Transmission may also be performed in pieces whereby, for example, a link to data is delivered to a receiving device or message receiving service and a user thereafter could click on a link to the data for subsequent view on a final receiving device, such as a web browser; in this example, the framework could first store the data in a repository for later view by the web browser. In another variation, transmission could be performed by the framework saving the data in a data storage, or data repository or within memory and then having a secondary apparatus or service within the framework pick up that data for transmission. Transmission may also be performed by transmitting to a service, such as an API-based service, which further transmits to the receiving device. Multiple phases, devices and apparatuses could be used in the course of overall transmission of augmented data as not all transmitted data in today's advanced transmission architectures are merely passed from a simple point A to a simple point B; multiple methodologies may be employed for transmission.

At step 541, a second augmented data element could be optionally saved directly to a data storage. While it is equivalently possible to transmit one or more data elements to a receiving device, such as a data service or database API service acting as a receiving device, and configure such device to store such received data to a data storage, depicted step 541 fundamentally serves to unequivocally illustrate that augmented data can be readily stored in a data storage, typically over a network, typically to a database or API-based storage service, at this point in the method.

At step 545, if secondary augmented data were identified, such could also be transmitted to a receiving device. This could occur at the same time as first augmented data elements are transmitted or it could occur in a second step at a subsequent time.

In steps 540 or 545, the communication/transmission of augmented caller data could, in some examples, be transmitted digitally, including but not limited to a web browser with web real-time communication (webRTC) capability, or to a telephone device.

In steps 540, 541 or 545, the communication/transmission or saving of augmented caller data could, in some examples, involve augmented data elements which are created using inputs of other augmented data elements. Such created augmented data elements should be construed as augmented data elements themselves. As an example, an augmented data element of the geographic location of a callee, in latitude/longitude form, could be used in a mathematical formula to compute distance between that location and the location of, perhaps, the callee, and the resulting distance between the two points could be deemed as another augmented data element. In other variations, the data of the second augmented data element could be formatted or computed into another form to represent a second data element; examples of such could be that a date could be changed to a differing international format or a date could be computed into an integer referring to the number of days since a fixed date or an address could be converted into a map image or URL which would equivalently represent the second data element. Whether an augmented data element is modified, reformulated, or even computed into an alternative augmented data element, be such when coming out of the data storage or thereafter, including at the point of transmission or saving, the fundamental concept of communicating or saving an augmented data element persists.

In another variation, the communicating of augmented data at step 540 or 545 may further include embedding augmented data into a voicemail or email or text message delivered to the intended callee of the inbound telephone call.

At step 550, in some variations, on a user interface (UI), the augmented data elements can be optionally displayed in a visual form on the receiving device. As an example, the augmented data containing an entity's address could be displayed, with or without the original caller telephone number on a mobile app. As another example, the augmented data could be displayed on a web page viewed from the receiving device. As another example, the augmented data could be referenced via a URL in the display of a text message on a mobile phone receiving device and further viewed upon click of the URL.

At step 550, the implementation could optionally add one or more interactive graphic elements to the display of the augmented data. As an example, next to an augmented data element reflecting the email address of a caller entity could be a graphical depiction of a button which is configured to respond to user input, such as a click.

At step 550, transmitted data could be, as an example, rendered to appear as a message in a layer in a web browser with text "call from John Smith at address 1234 Main St in New York" or on an LCD display sent in a SIP header intended for a caller name to appear on a SIP telephone or softphone as "John from New York".

At step 555, in an optional example variation, upon click of an optional graphical element as display in step 550, the receiving device may be configured to save an augmented data element to a computer database. In another variation, as an example, multiple augmented data elements could be saved upon one user interaction, such as a click. The database in this example could be a local or remote database.

At step 560, in an optional example variation, upon click of an optional graphical element as display in step 550, the receiving device may be configured, such as with software contained within an app or web app, to post an augmented data element to an API service. In another variation, as an example, multiple augmented data elements could be posted to the API service upon one user interaction, such as a click. API-based services provide many options for the use of augmented data elements, such as saving an augmented data element to a customer relationship management application's data storage or saving data to a SaaS application.

The order of steps in FIG. 5 is consistent with typical configurations, but in other configurations, the order of steps may be altered or combinations of steps could be employed.

Figure 6:
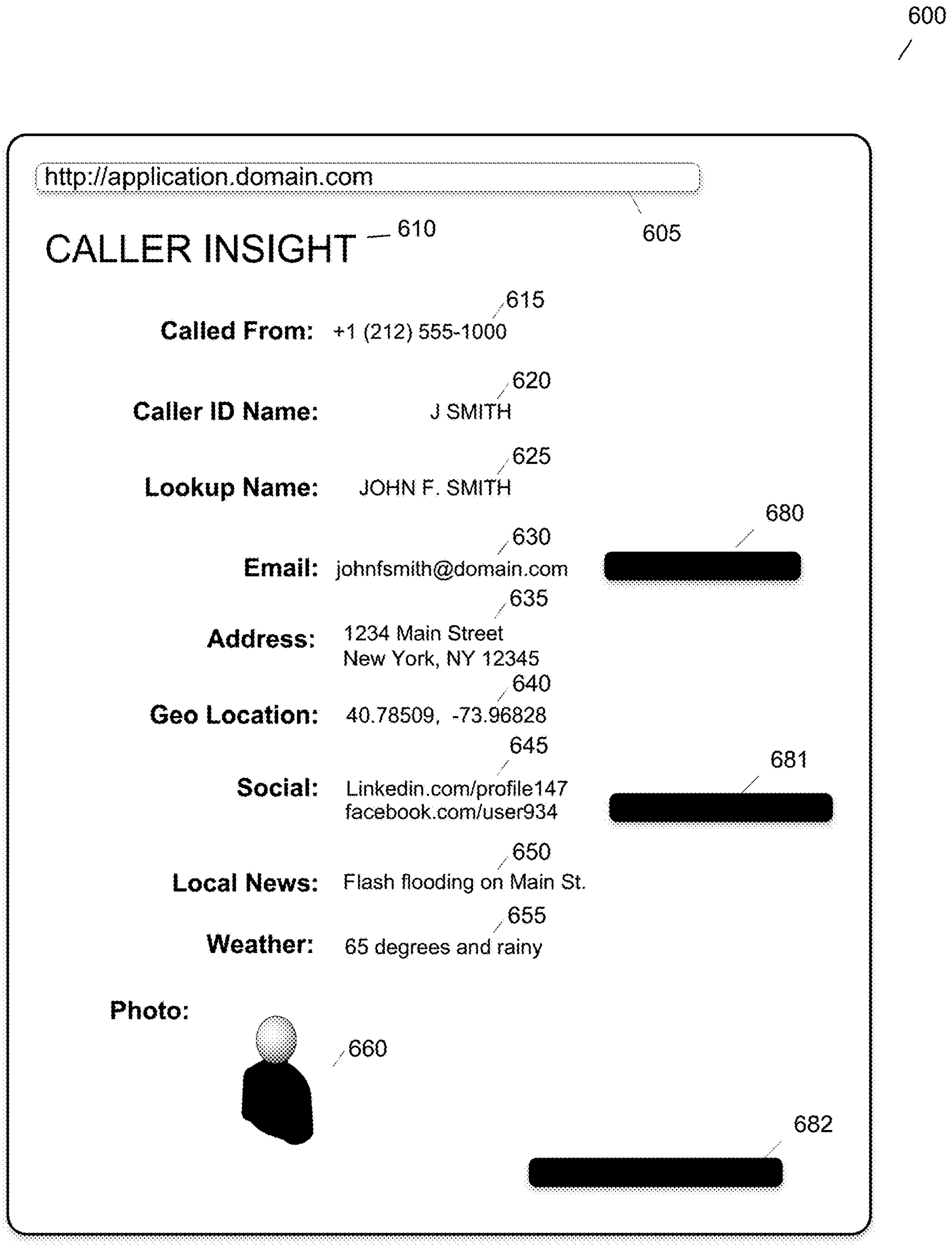
FIG. 6 is a screenshot of an example user interface displaying augmented data elements according to the methods and systems described herein, with further optional interactive buttons on the user interface configured to perform an action upon user input.

FIG. 6 illustrates an example user interface on a reviewing device, user interface 600, wherein the user interface is configured to display augmented data elements. The depicted example is merely representative of one possible variation of implementation. This example involves an application hosted by the telephonic switching and computing framework from a web server and the receiving device displaying multiple augmented data elements on a web page shown within a web browser. Other examples of a user interface include, but are not limited to, desktop applications, tablet applications, mobile phone applications, or even smart watch applications, all of which may not display a website address 605.

Example user interface 600 includes an example application name header, application name header 610. This application name header, "CALLER INSIGHT" reflects an application or page sharing details associated with the caller which were mostly not transmitted from the STN with the caller ID information during the STN's presentation of the inbound call and where most details on this example page were resolved through data augmentation. This sample application page could be part of a larger application or it could be a standalone application or it could not be deemed an application at all. In the case of a user interface being part of a larger application, a navigation menu could optionally be added.

This example user interface 600 also includes many data outputs, such as a caller data elements 615 and 620 and augmented data elements 625, 630, 640, 645, 650, 655 and 660.

Example caller data element 615 is depicted on this example user interface to represent the caller ID number transmitted from the STN at the time of the receipt of the inbound call. Here, in this example, the number is depicted in a formatted fashion, with non-numeric characters, for better readability.

Example caller data element 620 on example user interface 600 is also a piece of data transmitted from the STN with the presentation of the inbound telephone call. It represents the caller name known to the telephone company passing the call along the STN to the telephonic switching and computing framework.

Example augmented data elements 625, 630 and 635 on user interface example 600 represent possible augmented data elements discovered by associating the caller data element(s) 615 and/or 620 with additional data in a data storage and retrieving such associated augmented data elements pertinent to the same entity (e.g. person).

Example augmented data elements 640, 645, 650, 655 and 660 on user interface example 600 represents possible augmented data elements discovered by associating augmented data elements 625, 630, 635, individually or in combination, with further augmented data in a second data storage, plausibly without the incorporation of original caller data elements 615 and 620. Example augmented data element 635 could even be rendered in map form.

Example augmented data element 660 depicts an image. It should be noted that augmented data may not be limited to text or characters in a character set specific to a language. Augmented data may take the form of binary data which further represents, as examples, images, audio, video or other objects of data which, when rendered from raw data form, become meaningful to a user viewing an interface such as user interface 600.

The data displayed on example user interface 600 could, in some variations, be transmitted live from the telephonic switching and computing framework to the user interface without intermediate storage in a repository. In other variations, the data could be stored by the telephone switching and computing framework in a repository and simply retrieved for display by the user interface, as such is a common architectural model, particularly with web applications. In other variations, the data could be transmitted directly to the receiving device which may perform its own internal storage to local memory or a repository before outputting the data on the display of user interface 600. The options are widespread and can vary to suit the type and needs of the receiving device and its software.

Example user interface 600 further contains an optional illustrative submit button 680. This example submit button 680 depicts a possible scenario where upon the user of the receiving device clicking the button, the software responsible for the display of data on the user interface could save the augmented data element 630, the depicted email address, within a database, potentially in conjunction with other data associated with the entity (e.g. person John Smith) although such is not required.

Example user interface 600 further contains an optional illustrative submit button 681. This example submit button 681 depicts a possible scenario where upon the user of the receiving device clicking the button, the software responsible for the display of data on the user interface could perform an HTTP(S) POST to an API-based service to initiate a social media friend request to the social media profile identified by augmented data element 645, shown next to button 681.

Example user interface 600 further contains an optional illustrative submit button 682. This example submit button 682 depicts a possible scenario where upon the user of the receiving device clicking the button, the software responsible for the display of data on the user interface could perform, as two further sub-examples, a database save or an HTTP(S) POST to an API-based service, either of which would, in this button click example, save all data shown on the user interface to a customer relationship management software or help desk or sales management application into a record or series of records associated with the entity (e.g. person John Smith) depicted on user interface 600. The application or repository to which example button 682 saves data could be the same application as being viewed by user interface 600 or an entirely different application source from an entirely different location. In another related example to this variation, button 682 could further intelligently filter which data is new to the underlying repository of data and only insert/update the repository with new/changed data.

Many variations of user interfaces, such as example user interface 600, may exist. And, their methods of operation, from data retrieval to data visualization to handling actions upon optional user input, can vary widely with the desires and financial constraints of the implementation. In one further example of a modified variation of user interface 600, data validation could be performed before acting upon the user input of user submit buttons 680, 681 and 682. In another example of a modified variation of a user interface 600, the interface could be split into sub-interfaces, each views on different screens or devices. Many implementations could be easily construed by those comfortable with user interface design and related technologies.

Figure 7:
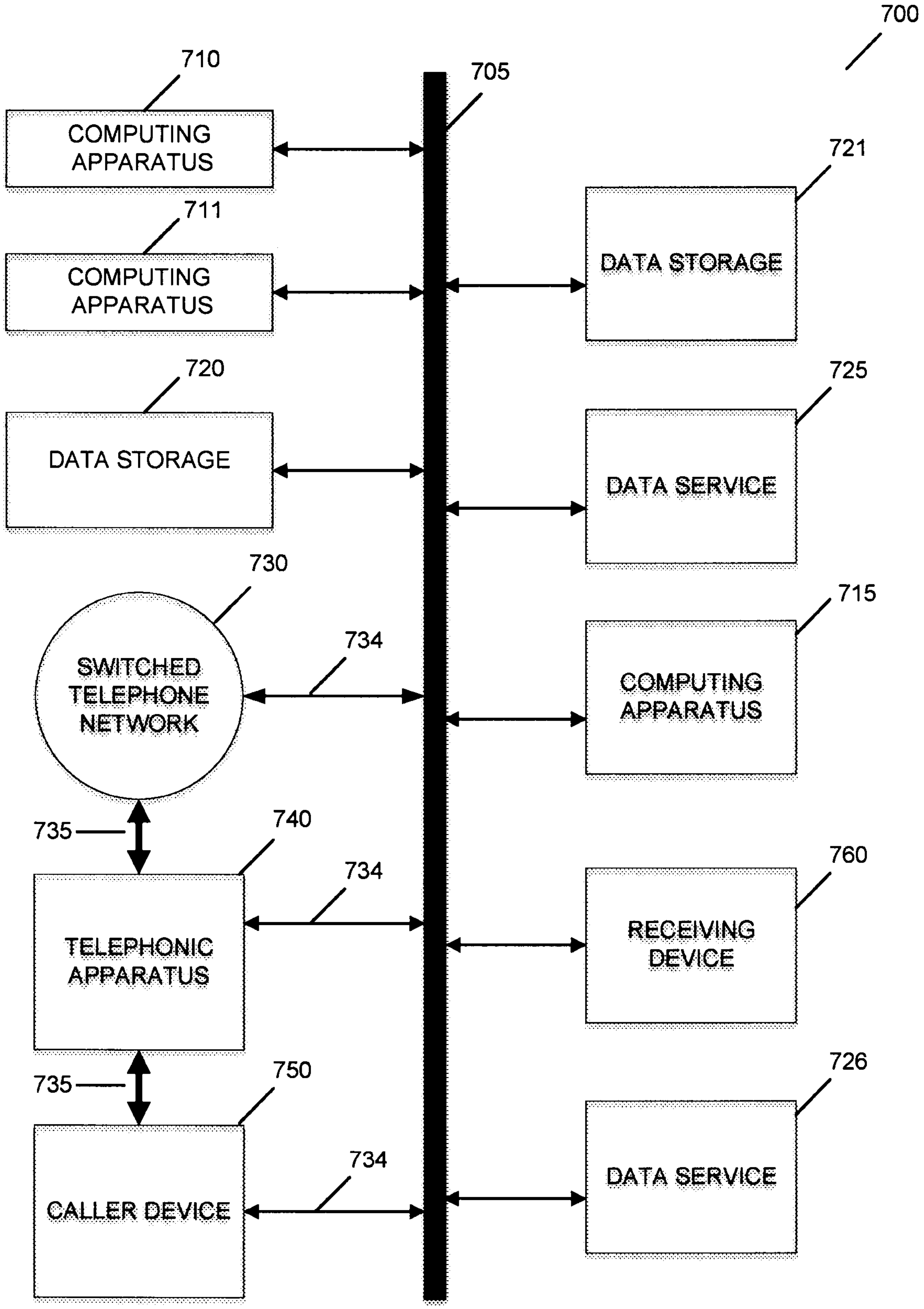
FIG. 7 is a diagrammatic view of computing apparatuses, data storages, a switched telephone network, a telephonic apparatus, a caller device, a data service and a receiving device.

In FIG. 7, we can see an example view 700 of a network 705, three network-connected computing apparatuses 710, 711, 715, two data storages 720, 721, two data services 725 and 726, a switched telephone network 730, a telephonic apparatus 740, a caller device 750, and a receiving device 760. This example view could depict a system used to augment and transmit telephonic entity data.

Example network 705 may reflect a wide-area network (WAN) or local-area network (LAN), or both, or any other network designed to facilitate communication between servers, computers, data storages, telephone networks, telephone switches, and other telephone hardware, including where such devices may be at different geographic locations. Network protocols employed may be varied and may include security and encryption mechanisms to securely transmit data. Protocols may, for example, include Transmission Control Protocol/Internet Protocol (TCP/IP) and Session Initiation Protocol (SIP). In the sample depiction of a network 705, the placement of items around the network depiction does not automatically connotate different network nodes, or private versus public connections, but one could in some instances infer that different placement around the network could potentially represent different geographies; one such example of that is the placement of the computing apparatus 715 depiction farther from the computing apparatus 711 depiction, which should not absolutely dictate different geographies but it could lend itself to the consideration of such.

Example network-connected computing apparatus 710 may provide computing functionality necessary to perform functions associated with, for example, database lookups, API-based searches, application server functionality, web server functionality and routing of data between devices. This apparatus, in some variations, could be the same apparatus as telephonic apparatus 740, such as in the instance of a computer telephone server which performs both telephony functions and computing functions in the same computer. In other variations, computing apparatus 710 may be a virtual apparatus, providing computing functionality from a cloud-based fabric of computing resources, including but not limited to virtual servers or compute-only resources.

Example network-connected computing apparatus 711 provides a second computing apparatus in some implementations. Some implementations may benefit from specialization of resources, which, for example, could be helpful with security segregation on different network nodes or computing resource optimization where certain computing apparatuses may be allocated certain tasks to minimize the CPU utilization on other machines. In other variations, computing apparatus 711 may be a shared apparatus, as previously described, or a virtual apparatus, providing computing functionality from a cloud-based fabric of computing resources, including but not limited to virtual servers or compute-only resources.

Example network-connected computing apparatus 715 serves to again illustrate that multiple computing apparatuses could potentially be used in an architecture and sometimes they are geographically split from other devices, particularly if the apparatus is a virtual one supplied as a service across the internet. In other variations, computing apparatus 715 may be a shared apparatus, as previously described, or a virtual apparatus, providing computing functionality from a cloud-based fabric of computing resources, including but not limited to virtual servers or compute-only resources. As a further example, computing apparatus 715 could be a web server.

Example data storage 720 is as previously described. Note, however, in this diagram that data storage 720 could exist either as a component of the computing apparatuses 710, 711 and 715 or as a separate data storage, or as a combination thereof. A data storage, as previously described herein, may also represent a virtual data repository offered over the internet as a cloud-based resource or as an API-based repository of data As previously described, there are many possible data storage architectures which may be utilized.

Example data storage 721 is as previously described except that it represents an optional architecture having more than one data storage.

Although it has already been described herein that a data service may be equivalent to a data storage, for illustrative purposes, data service 725 represents a data storage for retrieval and storage of data as a service, that service being, for example, a remote service accessible through data communication using one of many communication protocols, or, for example, an API-based service designed to allow for reading and/or writing of data through common API communication protocols.

Data service 726 is fundamentally the same as data service 725 except that in this example illustration it demonstrates that more than one data service could be utilized and they could be placed in different areas within the network topography for reasons including but not limited to, security concerns, resource allocation, network partitioning limitations, and latency minimization.

Example switched telephone network (STN) 730 may represent a public or private switched telephone network. In one possible variation, a public switched telephone network (PSTN) such as that of a local, national or international telephone company may receive a call from an originating subscriber or another telephone company. In the course of receiving a call, the equipment on the STN may receive caller ID information. In another variation, the STN may be a component of a communication-as-a-service platform which may fundamentally provide the STN resources and connectivity as part of an enhanced value-added or plain reseller-type service offering.

Example communications pathway 734 depicts communication from a telephone network or device occurring over the network 705, as compared to example telecommunication pathway 735 which depicts communication from a telephone network or device occurring over one or more analog or digital telephone lines or even TCP/IP communication. Analog telephone lines may include plain-old-telephone-service (POTS) lines. Digital telephone lines may include Integrated Services Digital Network (ISDN) lines, T1 lines, T3 (also known as Digital Signal 3/DS3) lines and SIP-based lines, as examples. It is further possible that a combination of communications pathway 734 and telecommunications pathway 735 may be used in the overall transmission of a telephone call and related data.

Example telephonic apparatus 740 (aka "telephonic apparatus" or "telephonic switching apparatus") reflects a telephone switch, the switch being a computer telephony apparatus designed to, as an example, accept inbound calls, obtain caller ID information, terminate calls, place outbound calls, and sometimes bridge the audio of inbound and outbound legs together to form an effective new single call, if so desired. The example telephonic switching hardware in this example is consistent with the definition of a telephonic apparatus previously described, but there are many possible forms for the telephonic apparatus, commonly constituting a framework for managing calls and related activities. This telephonic apparatus 740, in some variations, could be the same apparatus as computing apparatus 710 or 711 or 715, or vice versa, such as in the instance of a computer telephone server which performs both telephony functions and computing functions in the same computer. In another variation, the telephonic apparatus may be provided by another provider and consumed in this implementation as a communication-as-a-service offering designed to simulate the functionality of hardware (and perhaps utilizing hardware as part of their offering which may fundamentally perform the tasks as shown in this view).

Telephonic apparatus 740 may also be configured to associate caller ID information with a data record in the one or multiple data storages, such as data storage 720 or data service 725, as examples, and retrieve data. This association and/or retrieval may also be performed by a computing apparatus such as computing apparatus 710.

It should be understood that the disclosure herein of any telephonic apparatus being configured to associate caller ID information with a data record may, in some implementations, involve the telephone apparatus communicating with a network-connected server, an application server, a database server, or yet another computing apparatus to perform the fundamental task of associating the caller ID information with an augmented data record, but in other implementations a computing apparatus such as computing apparatus 710 may not be required where the telephonic apparatus can support the functionality needed utilizing its own physical or virtual or code-based abilities.

Example telephone apparatus 740 in some variations is further configured to play pre-recorded audio files, to effect text-to-speech voice synthesis, to accept the input of either human speech or DTMF digits from a telephone, to record audio and to communicate with analog and digital telephonic or computing devices. In some variations, telephone apparatus 740 could be a computer or computing device which also serves as a computing apparatus and/or application service, providing functionality of both telephonic and application-serving features.

Example caller device 750 is a telephone or computing device or computing software application intended to effect telephonic-style communication. Such devices may, as examples, be analog telephones, digital telephones, mobile phones, watch phones, SIP-based digital telephones, computer softphones, or computer software applications. Computer software applications further include, as examples, messaging applications, team chat applications, softphone applications, call center agent applications, help desk applets, sales team applets, customer relationship management applications, help desk support applications, SaaS applications, and voice/video communications software. A caller entity may use device 750 to originate a call onto the STN.

Example receiving device 760 is as previously described herein. Not specifically depicted in this diagram are optional display unit and user interface elements which are presumed for the purposes of this example diagram to exist consistently with the description for FIG. 4. As one possible example, receiving device 760 could be a mobile phone configured to execute an installed mobile application. In one configuration, telephonic apparatus 735 could pass caller ID information to a computing apparatus 710, which in turn could associated and retrieve augmented data from data storage 720 and data service 725 (acting fundamentally as a data storage) and transmit the augmented data elements to receiving device 760 via an SMS text message and/or a push notification which could activate a user interface further displaying the augmented data elements. As another possible example, telephonic apparatus 735 could be a communication-as-a-service fabric answering the calls, retrieving caller ID information, additionally providing computing resources to associate and retrieve augmented data in a virtual data storage, such as data storage 721, and data service 725, and transmit that information via email, MMS text message, and push notification to receiving device 760. In another configuration, for example, receiving device 760 could also represent a virtual device or service front-end accepting data on behalf of another device.

The various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements unless otherwise indicated.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A method for augmenting and transmitting telephonic entity data, comprising:

providing a telephonic switching and computing framework, the framework to connect with a switched telephone network (STN) and a data network;

providing access to a data storage over the data network, the data storage comprising a collection of data, the collection containing an augmented data record;

receiving an incoming telephone call from the STN, the incoming telephone call originating from a caller;

receiving caller ID information from the STN associated with the incoming telephone call, the caller ID information comprising a caller data element, the caller data element representing the caller's telephone number;

generating a trigger event upon detection of telephony signaling associated with receipt of the incoming telephone call from the switched telephone network (STN) within the telephonic switching and computing framework;

in response to the trigger event, searching for and retrieving within the data storage the augmented data record, the augmented data record comprising at least one augmented data element associated with the caller data element, the at least one augmented data element not being included within the received caller ID information, the at least one augmented data element comprising caller-related entity data obtained from one or more data sources, the at least one augmented data element being other than a calling party name and other than caller-provided content intended specifically for the called party, and not being obtained from caller input during the incoming telephone call;

further in response to the trigger event, transmitting the at least one augmented data element to a device over the network.

2. The method of claim 1, wherein the data storage is an API-based data storage framework configured to operate as a service.

3. The method of claim 1, wherein generation of the trigger event further requires satisfaction of at least one of the following conditions: the start of the incoming telephone call; the end of the incoming telephone call; the passage of time from another event; a user interaction with a browser; a user interaction with a mobile phone application; a user interaction with a computer; a user interaction with a computing device; or combinations thereof.

4. The method of claim 1, wherein the transmission of the augmented data element is performed via one of the following: email; short message service (SMS) or multimedia message service (MMS) text message; mobile phone push notification; an API post; saving to a repository; emailed link to a web page or mobile app; SMS or MMS text message link to a web page or mobile app, or combinations, thereof.

5. The method of claim 1, wherein the augmented data record comprises at least two augmented data elements.

6. The method of claim 1, wherein the device comprises at least one of the following: a mobile phone; a computer; a tablet computer; a watch; a computer server; an API-based service front-end service to a server; a cloud-based front-end service to a server; a database server; an application server; or combinations thereof.

7. At least one non-transitory computer-readable medium storing computer-readable instructions that, when executed by one or more computing devices, cause at least one of the one or more computing devices to execute according to claim 1.

8. The at least one non-transitory computer-readable medium of claim 7, wherein the execution of at least one of the one or more computing devices further comprises transmitting to the receiving device via at least one of the following: communication of data to a telephonic device; communication via email; communication via a short message service (SMS) text message; communication via a multimedia messaging service (MMS) message; communication across a Session Initiation Protocol (SIP) pathway to a SIP telephone; communication across a SIP pathway to a SIP softphone; communication via TCP/IP; communication across a webRTC pathway to a software application; communication via push notification to a mobile device; communication of data to a software application; communication of data to a hardware device; communication to an application server; communication to a web server; communication to a web browser; or combinations thereof.

9. The method of claim 1, further comprising:

providing access to a second data storage, the second data storage containing a second augmented data record, the second augmented data record containing a second augmented data element, the second augmented data element being associated with the caller data element or the augmented data element;

in response to the trigger event, searching for and retrieving within the second data storage the second augmented data record;

further in response to the trigger event, transmitting the second data element or a variation of the second data element to a device over a network.

10. The method of claim 9, wherein the second data storage is comprised of a database or an API-based data storage framework configured to operate as a service.

11. The method of claim 10, further comprising:

displaying on a graphical user interface the augmented data element.

12. The method of claim 11, further comprising:

displaying an interactive graphical element on the graphical user interface, the interactive graphical element being configured to respond to a user input, the user input comprising at least one of a user click; a user gesture; a user input; a user command; a user voice command;

in response to the user input, performing an operation associated with the augmented data element or the second augmented data element wherein the operation is comprised of one or more of: saving the augmented data element or second augmented data element to a computer database; posting the augmented data element or second augmented data element, or data computed or derived therefrom, to an API-based service; retrieving data associated with the augmented data element or second augmented data element; transmitting the augmented data element or second augmented data element; transmitting data derived or associated with the augmented data element or second augmented data element; or combinations, thereof.

13. The method of claim 1 further comprising:

displaying on a graphical user interface the augmented data element.

14. The method of claim 13, further comprising:

displaying an interactive graphical element on the graphical user interface, the interactive graphical element being configured to respond to a user input, the user input comprising at least one of a user click; a user gesture; a user input; a user command;

in response to the user input, performing an operation associated with the augmented data element wherein the operation is comprised of one or more of: saving the augmented data element to a computer database; posting the augmented data element, or data computed or derived therefrom, to an API-based service; retrieving data associated with the augmented data element; transmitting the augmented data element; transmitting data derived or associated with the augmented data element; or combinations, thereof.

15. A system for augmenting and transmitting telephonic entity data, comprising:

at least one data storage, the data storage comprising a collection of data, the collection containing an augmented data record;

a telephonic apparatus, the apparatus being configured to:

receive an incoming call from a caller entity at a caller device;

receive from a switched telephone network (STN) telephone calls;

receive caller ID information from the STN, the caller ID information comprising a caller data element, the caller data element representing the caller's telephone number;

communicate over one or more networks with a computing apparatus;

at least one network-connected computing apparatus to:

at least partially execute computer code with a processor;

communicate over the one or more networks with a telephonic apparatus;

access the data storage over the one or more networks;

generate a trigger event upon detection of telephony signaling indicative of receipt of an incoming telephone call from the switched telephone network (STN);

in response to the trigger event, search for and retrieve within the data storage the augmented data record, the augmented data record comprising at least one augmented data element associated with the caller data element, the at least one augmented data element not being included within the received caller ID information;

associate within the data storage a second augmented data record having at least one association between an augmented data element of the augmented data record with a second augmented data element from within the second augmented data record;

transmit the first augmented data element or the second augmented data element to a receiving device over the one or more networks.

16. The system of claim 15, wherein the computing apparatus and the telephonic apparatus are the same apparatus providing dual functionality.

17. The system of claim 15, wherein the telephonic apparatus comprises at least one of the following: one or more telephonic switching devices; one or more computing devices; a communication-as-a-service system; a computer telephony device; or combinations thereof.

18. The system of claim 15, wherein the receiving device comprises at least one of the following: a telephone; softphone; a computer; a computing device; a watch; a server; a database server; an application server; a proxy server; an API front-end configured to receive data on behalf of a server or computing device; or combinations thereof.

19. A method for augmenting and transmitting telephonic entity data, comprising:

providing a telephonic switching and computing framework, the framework to connect with a switched telephone network (STN) and a data network;

providing access to a data storage over the data network, the data storage comprising a collection of data, the collection containing an augmented data record;

providing access to at least one data storage over the data network, the at least one data storage comprising at least one collection of data;

providing access to a collection of data containing an augmented data record;

receiving an incoming telephone call from the STN, the incoming telephone call originating from a caller;

receiving caller ID information from the STN, the caller ID information comprising a caller data element, the caller data element representing the caller's telephone number;

providing access to a collection of data containing a second augmented data record, the second augmented data record having at least one association between an augmented data element of the augmented data record with a second augmented data element from within the second augmented data record, the augmented data element of the augmented data record not being contained within the caller ID information;

generating a trigger event upon detection of telephony signaling associated with receipt of the incoming telephone call from the switched telephone network (STN) within the telephonic switching and computing framework;

in response to the trigger event, searching for and retrieving within the data storage the augmented data record, the augmented data record comprising the augmented data element associated with the caller data element;

further in response to the trigger event, searching for and retrieving within the one or more data storages the second augmented data record;

further in response to the trigger event, saving the second augmented data element or a variation of the second augmented data element to a data storage over the network;

further in response to the trigger event, transmitting the first augmented data element or the second augmented data element to a receiving device over the network.

20. The method of claim 19 wherein the telephonic switching and computing framework includes a web server, the web server being configured to transmit the saved second augmented data element over a data network.

* * * * *